United States Patent [19]

Shannon et al.

[11] Patent Number: 5,237,584
[45] Date of Patent: Aug. 17, 1993

[54] HIGH POWER OPTICAL CAVITY FOR END-PUMPED SOLID STATE LASER

[75] Inventors: David Shannon, Sunnyvale; Richard W. Wallace, Los Altos, both of Calif.

[73] Assignee: Lightwave Electronics Corporation, Mountain View, Calif.

[21] Appl. No.: 790,646

[22] Filed: Nov. 8, 1991

[51] Int. Cl.[5] .............................................. H01S 3/081
[52] U.S. Cl. ......................................... 372/93; 372/99
[58] Field of Search .................... 372/71, 93, 95, 97, 372/99

[56] References Cited

U.S. PATENT DOCUMENTS

4,446,559  5/1984  von Bieren ............................ 372/98

Primary Examiner—John D. Lee
Assistant Examiner—Robert E. Wise
Attorney, Agent, or Firm—John Schipper

[57] ABSTRACT

Apparatus for providing a laser light beam or an amplifier light beam that is scalable to very high light beam output power by use of approximately identical optical sections, each section containing one or more laser gain media and one or more fold mirrors, spaced apart from the laser gain media by a distance d. The laser gain media or the fold mirrors, or both, have a curved reflecting surface of radius R. The lengths d and R are chosen to provide a stable optical system within each optical section and to compensate for the development of a thermal lens within each laser gain medium when this medium is pumped by a light source. The optical sections may be concatenated to scale the light beam output power upward without limitation, except for optical absorption and losses that occur at each reflecting surface.

24 Claims, 6 Drawing Sheets

HIGH POWER OPTICAL CAVITY FOR END-PUMPED SOLID STATE LASER

FIELD OF THE INVENTION

This invention was developed under Contract No. F 33615-90-C-1512 between the Defense Advanced Research Projects Agency and Lightwave Electronics Corporation. The Government has rights under this invention. This invention relates generally to a power-scalable laser cavity or amplifier optical system in which thermal lensing of the laser material is incorporated into the optical system and compensated for.

BACKGROUND OF THE INVENTION

The major advantage of this technique is that multi-bounce end-pumped lasers or amplifiers can be scaled up to high powers (>100 Watts) while maintaining fundamental mode ($TEM_{00}$) operation and high optical conversion efficiency. End-pumped lasers offer many advantages over side-pumped lasers in efficiency and beam quality. This is true if all of the pump energy can be imaged inside the fundamental mode radius of the solid state laser and if the gain medium is long enough to absorb a large fraction of the pump light. A disadvantage of an end-pump laser is that a gradient in the index of refraction is produced within the laser mode, due to nonuniform heating of the laser gain material. This problem is addressed in S. Kubota et. al., "Thermal aberration analysis of a laser-diode-pumped Nd:YAG laser", Technical Digest of Lens Design Conference", Manuscript No. 1354-17, (1990) and by M. E. Innocenzi, et. al., "Thermal Modelling of Continuous-wave End-pumped Solid-state Lasers", Appl. Phys. Lett., vol. 56, 1831 (1990). The effect of a nonuniform refractive index on the laser mode is similar to the effect of a lens positioned close to the pump light beam entrance point. With the availability of high power AlGaAs laser diodes, high power at high power density is now possible at a single pump point, but thermal lensing of the laser gain material must be compensated for if single point pumping is to be used.

U. O. Farrukh et al, in "An Analysis of the Temperature Distribution in Finite Length Solid-state Laser Rods", I.E.E.E. Jour. Quant. Electr., vol. 24, 2253-2263 (1988), have theoretically analyzed the temperature distribution in an end-pumped solid state laser rod of finite length for single pulse heating and for continuous or long pulse heating, assuming that cooling from each rod surface is linear and that temperature excursions from ambient are modest. This analysis also assumes that isotropic material behavior prevails in the rod, which is not true when thermal lensing develops. M. E. Innocenzi et al, ibid, extend the Farrukh et al analysis to situations where the rod surface is convectively cooled and is in contact with an isothermal heat sink or source. These authors compute the single pass, optical phase change associated with refractive index changes and find that, in one representative example, thermal variations in this index account for 74 percent of the thermally induced optical focusing.

Keirstead and Baer, in "Ten Watt $TEM_{00}$ output from a diode-pumped, solid state laser", Abstract CFC3, Conference on Lasers and Electro-optics, 1991, discuss use of a tightly folded resonator ("TFR") laser oscillator design in which light from three laser diode bars is coupled into an optical cavity that is defined by a plurality of reflective surfaces. All reflective surfaces but one of the TFR are planar, and Keirstead et al report a 32 percent pumping efficiency for an Nd:YAG laser driven at 27 Watts. However, this configuration does not permit easy scale-up of the input power, and thus the output power, by use of additional reflectors because thermal lensing, thermal depolarization and other maladies that arise at higher laser power levels limit such scale-up. Laser mode spot size mismatch and other problems arise where a larger number of reflectors are used.

Seelert, Skrlac and Kortz, in "One Watt single frequency diode pumped Nd:YAG laser system", Abstract MF5-1, Advanced Solid State Laser Conference, Hilton Head, SC, March 1991, p. 104, discuss use of a multi-stage, end pumped Nd:YAG laser gain system to produce an amplifier ("EDDA") that produces an light beam with output power 600–1,000 milliwatts. Each stage of the EDDA includes an input lens, a prism with first and second fully reflecting surfaces, a laser gain medium to receive an input light beam from the first reflecting surface of the prism at a first end of the medium, and to receive an end pump light beam from a second end of the medium, a planar reflecting at the second end of the laser gain medium to reflect the amplified input light beam to the second reflecting surface of the prism, and an output lens to receive the amplified input light beam from the second reflecting surface of the prism. The input and output lenses serve to collimate or refocus the light beam from stage to stage, and all reflecting surfaces are planar. Development of a thermal lens within each laser gain medium is not explicitly compensated for within each stage, and the amplifier output power is limited to a modest value of about one or a few Watts.

What is needed is an optical configuration that allows straightforward scaling of laser output power to higher values without the limitations imposed by the presence of thermal lensing and other thermal problems that appear at the higher laser power levels.

SUMMARY OF THE INVENTION

These needs are met by the invention, which in one embodiment provides an optical cavity that incorporates thermal lensing induced in the laser material. This allows $TEM_{00}$ operation and straightforward scaling to higher power. The laser or amplifier relies upon a plurality of light beam bouncepoints in laser gain media that form part of an optical cavity in a folded path geometry. Light beam bouncepoints on a first side of the folded light beam path are positioned in the laser gain media of the optically pumped laser material. The laser beam or amplified light beam increases in energy and is affected by thermal lensing as the beam passes through each laser gain medium. Light beam bouncepoints on a second side of the optical cavity each include an optical element with at least one (curved) light-receiving surface that compensates for the thermal lens effect to support a stable laser mode within the optical cavity. Each given pair ("section") of a laser gain medium and an optical element forms a stable laser $TEM_{00}$ mode that is replicated through all sections or consecutive pairs of light beam bouncepoints. Because all characteristics of the laser mode are repeated through each section, scaling to higher laser or amplifier power is achieved by simply adding more optical sections to the optical cavity of the laser or amplifier. Preferably, although not necessarily, these sections are approximately identical. Scaling to higher power is limited only by accumulation of internal loss in the laser cavity, which reduces the optical conversion efficiency. In another embodiment, the reflecting surface of each laser gain medium has a radius of curvature that is also chosen to promote optical cavity stability and to compensate for development of a thermal lens.

BRIEF DESCRIPTION OF THE DRAWINGS

FIG. 2A is a schematic view of a half symmetric resonator that the distributed gain laser upon which FIG. 1 is based. FIG. 2B is a schematic view of an equivalent half symmetric resonator that incorporates a small fold angle at the pump point.

DETAILED DESCRIPTION OF THE INVENTION

Figure 1A:
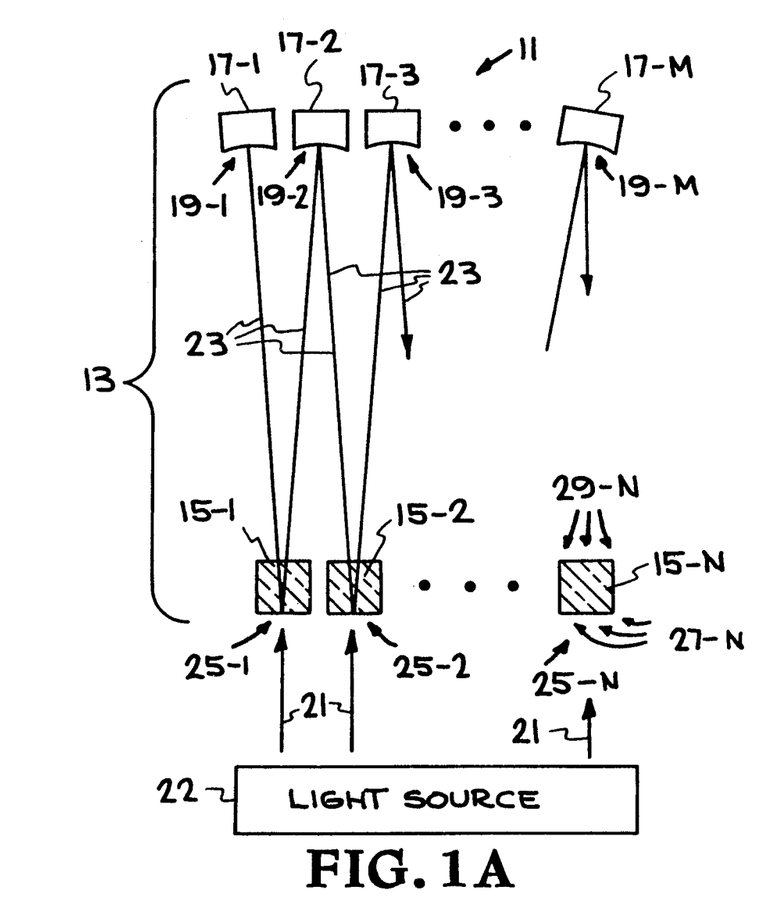
FIG. 1A and 1B are schematics of a periodic mode laser cavity which is comprised of many bouncepoints. The laser mode is periodically refocussed to match the pump spot size in each successive bouncepoint. This laser can be scaled to higher power by adding more sections.

FIG. 1A illustrates a first embodiment 11 of the invention, including an optical cavity 13 defined by a plurality of N end-pumped laser gain media 15-$i$ ($i=1, 2, \ldots, N$; $N \geq 2$) and by a plurality of M highly reflecting fold mirrors or reflecting surfaces 17-$j$ ($j=1, \ldots, M$; $M = N-1$, $N$ or $N+1$) spaced apart from the gain media 15-$i$ as shown. Each fold mirror 17-$j$ and gain medium 15-$i$ provides a light beam bouncepoint 19-$j$ and 25-$i$, respectively. The last fold mirror 17-M in the sequence may serve as a fold mirror, to reflect and return the incident light beam along the beam's original optical path (laser mode) or may have a predetermined transmissivity at the wavelength $\lambda_L$ and serve as a light beam output coupler (amplifier mode). The optical cavity 13 is preferably periodic and maintains proper laser mode overlap between a laser diode pump light beam 21, produced by a pump light source 22, and a light beam 23, produced by a laser gain medium 15-$i$ ($i=1, 2, \ldots, N$) positioned within the optical cavity 13. The pump light beam 21 consists of a plurality of smaller end pump beams, each of which delivers light to a single laser gain medium 15-$i$. Adding more laser gain media, and thus more bouncepoints, to this cavity will increase the total laser power, but will not change the important laser mode characteristics. This optical arrangement can be designed to incorporate large amounts of thermal lensing in the laser gain medium and still support efficient TEM$_{00}$ operation. The periodic mode optical system is described in detail below.

Figure 1B:
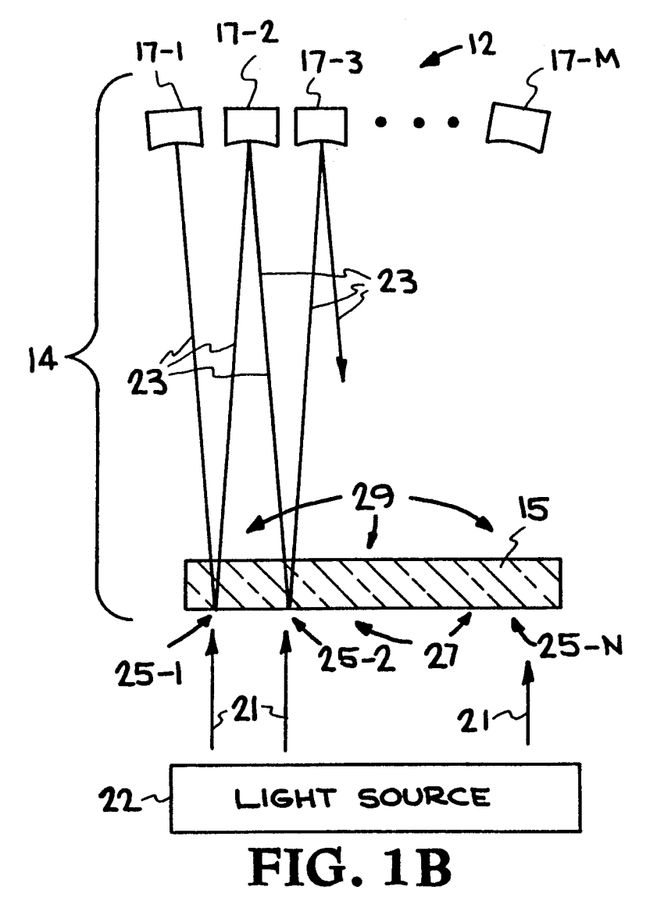

Each component 15-$i$ of the laser gain medium is polished on a front side 27-$i$ and on a back side 29-$i$ thereof ($i=1, 2, \ldots, N$). Each front side 27-$i$ is coated to be at least partly transmissive at the pump light beam wavelength $\lambda = \lambda_P$ and highly reflective at the laser light beam wavelength $\lambda = \lambda_L$. Each back side 29-$i$ is arranged to be highly transmissive at the laser wavelength $\lambda = \lambda_L$, for example, by coating the back surface 29-$i$ with an anti-reflection coating. Directed pump beam energy 21, such as that obtained from one or more focussed laser diodes 22, enters a laser gain medium 15-$i$ at a bouncepoint position 25-$i$. The laser gain medium 15-$i$ produces a laser or amplifier output light beam 23 that is periodically refocussed by a fold mirror 17-$j$ into the next laser gain medium 15-($i+1$) in the folded path geometry. Although the laser gain media 15-$i$ are shown as a plurality of separate media, laser gain may also be implemented in a unitary laser gain medium 23, with optically isolated compartments, that combines the plurality of laser gain media, as illustrated in FIG. 1B.

Figures 2A, 2B:
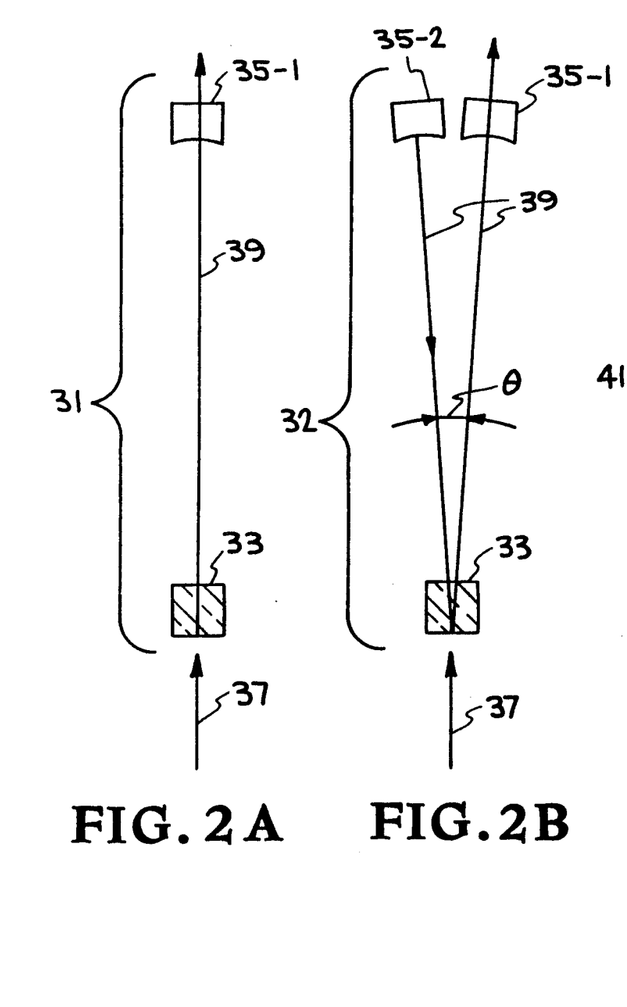

The invention can be understood by analogy to a straightforward half-symmetric optical cavity 31 illustrated in FIG. 2A. The half-symmetric optical cavity 31 includes an optically coated laser gain crystal 33 and a partially transmissive concave mirror 35-1. The focussing power of the mirror 35, which also serves as an output coupler, exactly balances the effects of diffraction and thermal lensing in the laser gain material to produce a stable optical cavity 31.

FIG. 2B is nearly equivalent to FIG. 2A, except that first and second external mirrors 35-1 and 35-2 are introduced so that the laser mode path within the resulting optical cavity 32 is now V-shaped. If the fold angle $\theta$ of this path is kept small ($\theta < 10°$), the mode diameters at the output coupler and within the laser gain material 33 will be almost identical to those in FIG. 2A. The V-shaped laser or amplifier path can be treated as an optical section that can be replicated and grouped together to form the laser shown in FIGS. 1A and 1B. The periodic mode resonator can be represented as a plurality of half-symmetric lasers that are optically connected in series. The cavity 32 shown in FIG. 2B has twice the optical gain and half the saturation power of the cavity 31 shown in FIG. 2A, if the mirrors 35-1 and 35-2 are assumed to be perfect reflectors at the laser wavelength.

Figure 3:
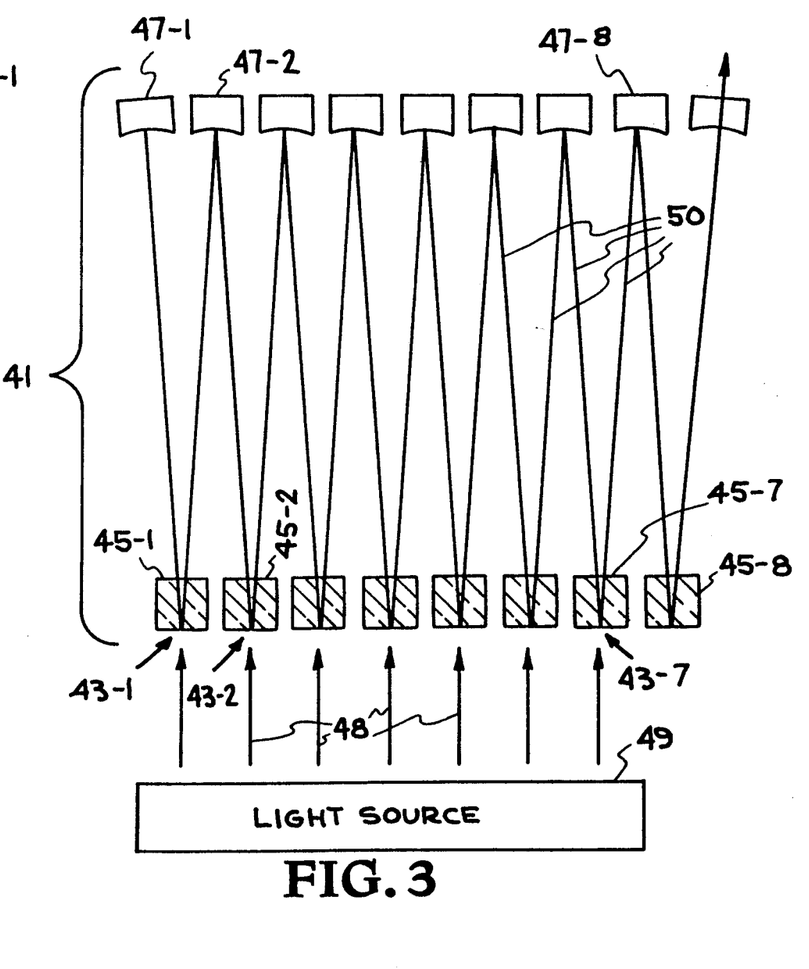
FIG. 3 is a schematic view of the periodic mode laser showing eight bounce-points and incorporation of eight thermal lenses and nine concave mirrors.

FIG. 3 illustrates an optical cavity 41 with $N=8$ bouncepoints 43-$k$ ($k=1, \ldots, 8$) and associated laser gain media 45-$k$ and fold mirrors 47-$m$ ($m=1, \ldots, 9$) that are spaced apart from the laser gain media 45-$k$. The laser gain media 45-$k$ are pumped by a pump light beam 48 from a pump light source 49, and a light beam 50 of laser wavelength $\lambda = \lambda_L$ is produced within, and retraces its optical path within, the optical cavity 41. In FIG. 3, the number of fold mirrors is one greater than the number of laser gain media.

Figure 4:
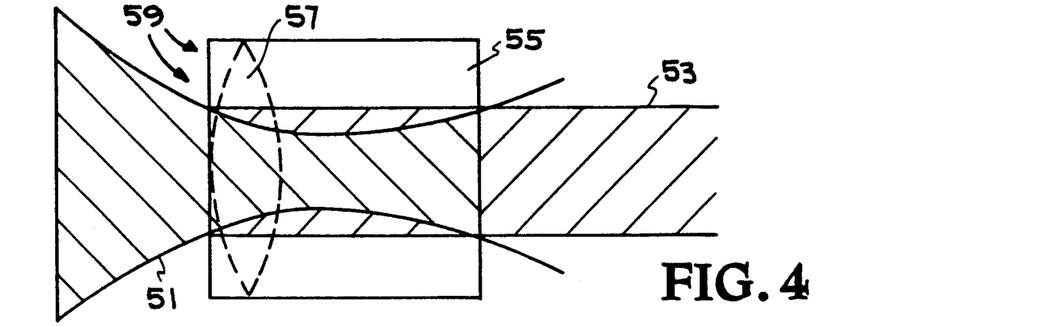
FIG. 4 illustrates mode overlap in a conventional end-pumped laser.

FIG. 4 illustrates the mode overlap of a pump light beam 51 and resulting laser or amplifier beam 53 in the laser gain medium 55 of a conventional half symmetric laser or amplifier cavity, such as shown in FIG. 2A. FIG. 4 also indicates the approximate position of a thermally induced lens 57 within the laser gain medium 55. The presence of the thermal lens alters the cold optical cavity laser mode by changing the divergence of the beam 53 as the beam passes through the laser gain medium 55. The thermal lens and its effects are often distributed throughout the length of the laser gain medium 55. However, it is often convenient to model the effects of the thermal lens 57 as if this lens is "lumped" and placed at a single position within the laser gain medium 55, for example, at the front surface 59 from which the laser beam 53 is reflected within the laser gain medium 55. To preserve good mode overlap between the pump beam 51 and the laser or amplifier beam 53, the effect of the thermal lens must be accounted for when designing the optical cavity or resonator. This can be accomplished by choosing an appropriate radius of curvature for a light-receiving surface of each fold mirror and laser output coupler and choosing a suitable distance between the light beam reflecting surfaces of a fold mirror and a next consecutive laser gain medium. In this manner, thermal lensing of a laser gain medium is incorporated into the resonator design. A half-symmetric resonator can also be the building block for a periodic mode resonator that compensates for the thermal lens at each cavity bouncepoint.

Figure 5:
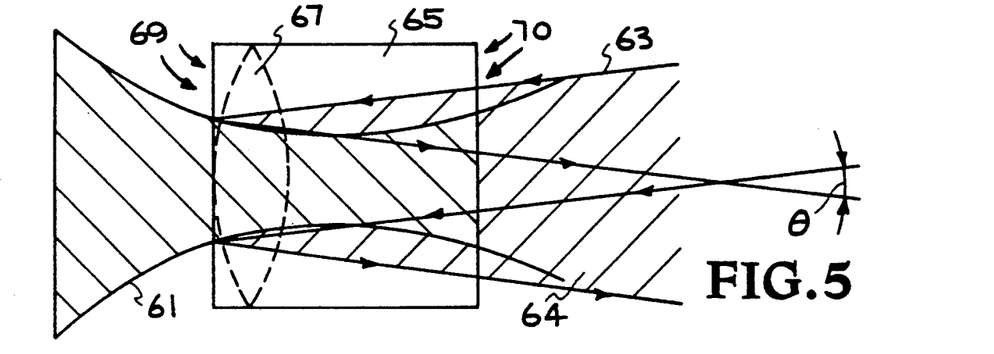
FIG. 5 illustrates mode overlap between the diode pump light and a folded laser mode according to the invention.

FIG. 5 shows the actual mode overlap that takes place at a bouncepoint when the laser mode contains a small fold angle (i.e. the periodic mode laser). A pump light beam 61 enters a laser gain medium 65 at a first end 69 and an input laser light beam 63 enters the laser gain medium 65 from a second end 70 of the laser gain medium 65, with the laser beam 63 being oriented at a non-zero incidence angle $\theta/2$ relative to a planar (or curved) reflecting surface 69 at the first end of the laser gain medium 65. An output laser light beam 64 exits from the laser gain medium 65 at the second end thereof, in an output light beam propagation direction that differs from the input light beam propagation direction by a fold angle $\theta$. If the fold angle $\theta$ is kept small, mode overlap and thermal lens effects will not change significantly from the unfolded path illustrated in FIGS. 2A or 4. A thermal lens 67 develops within the laser gain medium 65, as in FIG. 4.

Figure 6:
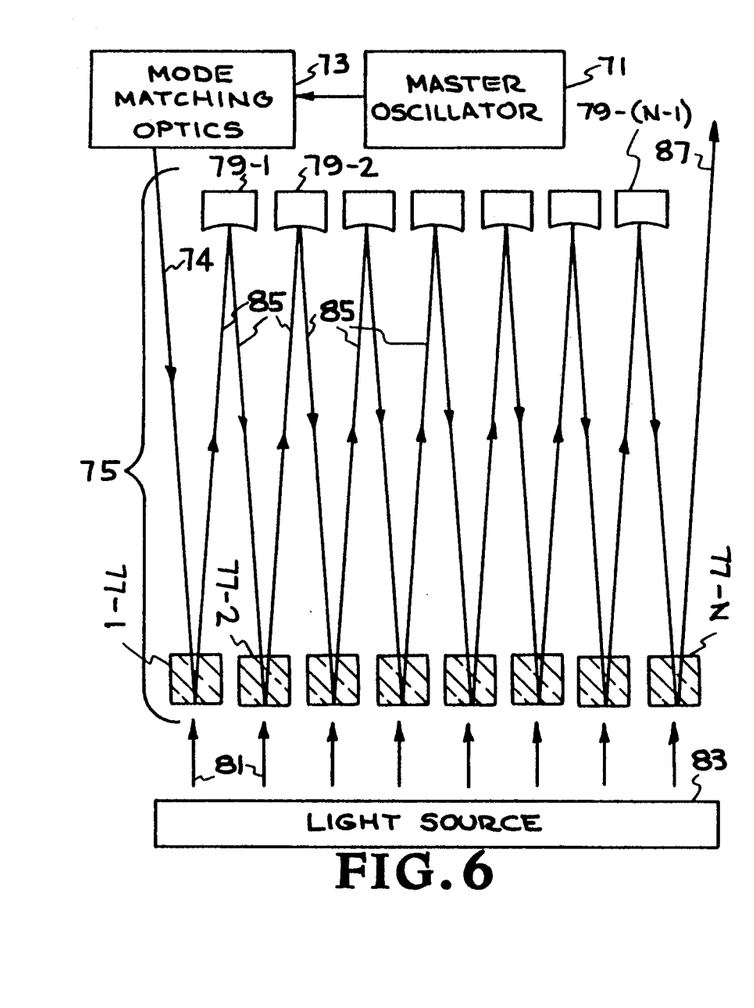
FIG. 6 illustrates distributed gain elements used as a single pass amplifier according to the invention.

FIG. 6 shows how the periodic mode optical system can be used in a single-pass amplifier configuration. The light beam output of a master oscillator 71 is received by mode matching optics 73, which produces and issues a mode matched input light beam 74 that passes in an optical cavity 75 defined by a plurality of N laser gain media 77-$i$ ($i = 1, 2, \ldots, N; N \geq 2$) and a plurality of N-1 fold mirrors 79-$i$ with suitable curved (or planar) reflecting surfaces. The laser gain media 77-$i$ are pumped by an end pump light beam 81 produce by a pump light source 83 as shown. A light beam 85 to be amplified is produced and issued from a laser gain medium 77-$i$, is received and reflected by a fold mirror 79-$i$, and is received and amplified by the next consecutive laser gain medium 77-$(i+1)$ to continue the amplification process. The light beam 85 passes through each laser gain medium 77-$i$ once and is amplified thereby and then issues from the optical cavity 75 as an amplified output light beam 87 at the same wavelength as the input light beam 74.

Figure 7:
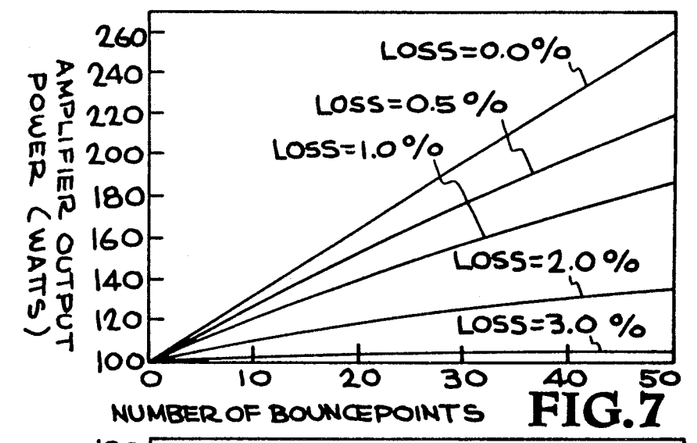
FIG. 7 graphically illustrates how amplifier output power scales with number of bouncepoints for a given amount of optical loss and extractable energy per bouncepoint.

FIG. 7 illustrates the power output scaling of such an optical amplifier as more bouncepoints are added. If no optical loss occurs at each optical element, the normalized output power would increase linearly with the number of optical sections or pairs of bouncepoints used. Because optical loss does occur at each optical element, the normalized output power increases monotonically with the number of bouncepoints but reaches a finite saturation output power value that depends upon the optical loss experienced at each optical section, as illustrated in FIG. 7.

Figure 8:
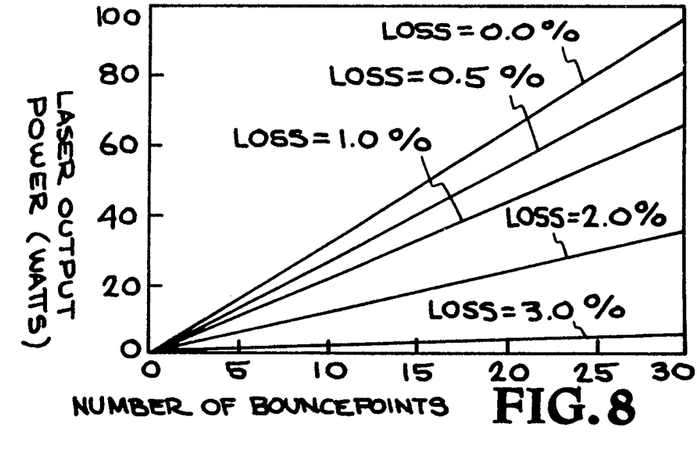
FIG. 8 graphically illustrates how laser output power scales with number of bouncepoints for a given amount of optical loss and extractable energy per bouncepoint.

FIG. 8 illustrates the power output scaling of a laser constructed as shown in FIGS. 1A or 1B, as more bouncepoints are added. The interpretation of FIG. 8 is similar to that of FIG. 7.

Figure 9:
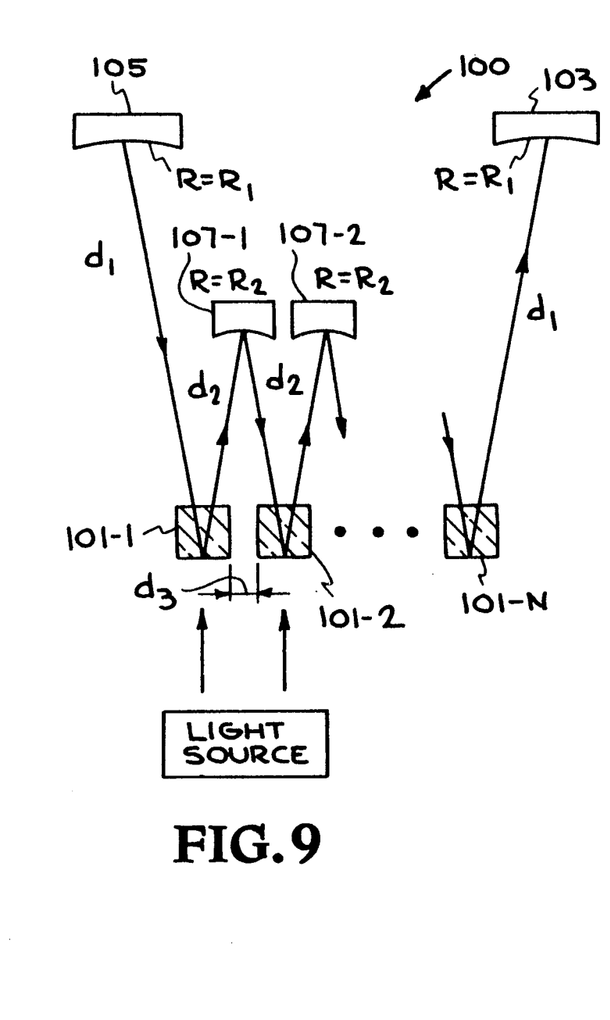
FIG. 9 is a schematic view of an embodiment of an optical section that has been analyzed theoretically and compared with experimental results for this section.

With reference to FIG. 9, we have used a ray matrix formalism to analyze a laser or amplifier output light beam for two or more optical sections, each optical section 100 consisting of: N laser gain media 101-$i$ ($i = 1, 2, \ldots, N; N \geq 2$); two fold mirrors 103 and 105 having radii of curvature $R = R_1$ and spaced apart from the laser gain media 101-1 and 101-N, respectively, by a distance $d_1$; and N-1 fold mirrors 107-$j$ ($j = 1, \ldots, N-1$) having radii of curvature $R = R_2$ and spaced apart from two consecutive laser gain media 101-$j$ and 101-$(j+1)$ by a distance $d_2$. We have qualitatively confirmed the analytical results by experiments conducted on relatively simple configuration consisting of one or two optical sections (N=1 or 2). We have used this analysis to determine the appropriate gain medium-to-fold mirror spacings $d_1$ and $d_2$ and fold mirror radii of curvature $R_1$ and $R_2$ in FIG. 9, assuming that a thermal lens of specified focal length $f_T$ develops at or near the front surface of each laser gain medium 101-$i$. We have used a ray matrix analysis based upon the following matrix equations describing an equivalent ray matrix M for a single optical section.

$$M = M_2(R_1)M_1(d_1,h;n_1,n_2)[M_2(f_T)M_1(d_2,h;n_1,n_2)M_2(R_2)M_1(d_2,h;n_1,n_2)]^{N-1}M_1(d_2,h;n_1,n_2)M_1(d_1,h;n_1,n_2)M_2(R_1), \quad (1)$$

where $M_1(x,y;m,n)$ is a ray matrix for straight line propagation by a distance x in a medium with refractive index m plus straight line propagation by a distance y in a medium with refractive index n, and $M_2(R)$ is a ray matrix representing reflection by a concave spherical mirror with radius of curvature R or focusing by a thin lens of focal length $f = 2R$, $n_1$ is the refractive index for the ambient medium and $n_2$ is the refractive index for the pumped laser gain material. Here, a light beam that passes through a laser gain medium and a thermal lens of focal length f, is reflected from a spherically shaped end surface of radius R and passes through the laser gain medium and the thermal lens again experiences an equivalent reflection from a spherically shaped surface of radius of curvature $$R'(R,f) = [(1/R)^{-1} + (1/f)^{-1}]^{-1} \quad (2).$$

If the end surface of this laser medium is planar so that the corresponding radius of curvature is infinite, Eq. (2) reduces to $R' = f$, as in Eq. (1). If an integer number q of the optical sections are arranged in series, the matrix product $M^q$ would represent the action of such an arrangement. The ray matrices $M_m$ (m = 1,2) in a reduced form developed by A. Siegman (*Lasers*, University Science Books, 1986, pp. 581-607) are given by $$M_1(d1,d2;n1,n2) = \begin{bmatrix} 1 & (d_1/n_1) + (d_2/n_2) \\ 0 & 1 \end{bmatrix} \quad (3)$$

$$M_2(R) = \begin{bmatrix} 1 & 0 \\ -2/R0 & 1 \end{bmatrix} \quad (4)$$

The ray matrix M shown in Eq. (1) has been analyzed for N=2 to determine values of the quantities $d_1$, $d_2$, $R_1$ and $R_2$ to produce an optically stable configuration, where the laser gain material is Nd:YAG, $n_1=1$, $n_2=1.82$ at $\lambda=1$ μm), $n_2=1.80$ at $\lambda=2$ μm, h=5 mm, and a light beam minimum spot size of s=400 μm is to be preserved within each optical section shown in FIG. 9. The focal length $f_T$ of the thermal lens that develops in the pumped laser gain material is estimated to be about 100 mm (positive) for pump light beam power of 10 Watts at a wavelength of $\lambda_P=0.809$ μm or 0.785 μm incident upon the laser gain medium. One suitable choice for the remaining optical parameters is $d_1=41.8$ mm, $d_2=304$ mm, $R_1=300$ mm and $R_2=100$ mm. Two laser gain media 101-1 and 101-2 are spaced apart by a distance $d_3=6$ mm, which produces a fold angle of $\theta \approx 6°$. The presence of a non-zero fold angle $\theta$ introduces a small amount of astigmatism at the front surface of a laser gain medium such as 101-1, but this amount is too small to produce any experimentally significant effect. The configuration illustrated in FIG. 9 has been constructed, and it has been experimentally confirmed that this configuration is stable and does maintain a light beam minimum spot size of about s=400 μm from one optical section to the next, arrangement. The configuration illustrated in FIG. 9 is extremely stable, and the TEM$_{00}$ mode dominates all other transverse modes by at least 40 dB.

Figure 10:
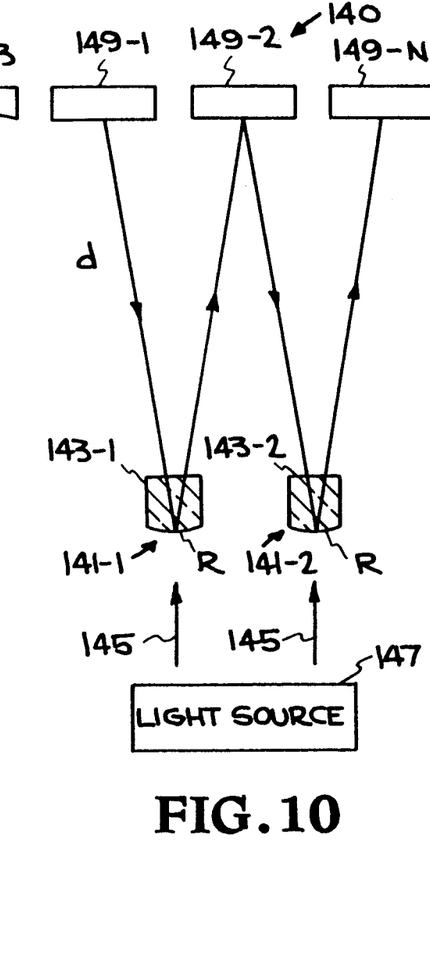
FIGS. 10 and 11 are schematic views of optical sections in which one surface of each of the laser gain media is concave rather than planar.
Figure 11:
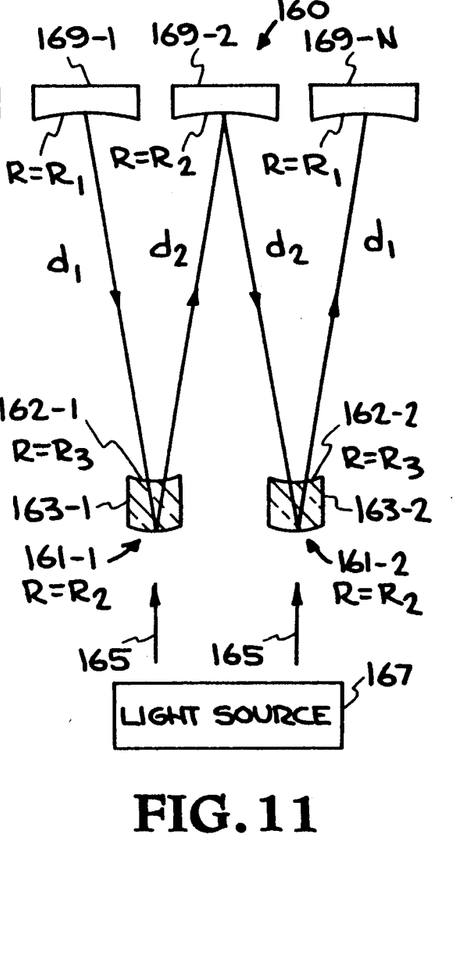

In another embodiment 140 of the invention, shown in FIG. 10, the front surface 141-$i$ (i=1, 2, ..., N) of each of N laser gain media 143-$i$ given a curvilinear surface (e.g., a spherical or cylindrical surface) rather than a planar surface. The laser gain media 143-$i$ are pumped by a pump light beam 145 from a pump light source 147. Each of a plurality of fold mirrors 149-$j$ (j=1, ..., N−1 or N) is provided with a planar reflecting surface rather than a concave surface. The corresponding equivalent ray matrix M for the optical section illustrated in FIG. 11 becomes $$M = M_1(d_1,h;n_1,n_2)[M_2(R'(R,f))M_1(2d_2,h;n_1,n_2)]^{N-1}M_2(R',f)M_1(d_1,h;n_1,n_2), \quad (5)$$

where the matrices $M_1$ and $M_2$ are defined in Eqs. (3)–(4). A thermal lens equivalent focal length $f_T'=R'(R,f_T)$ may be determined from a combination of the "true" focal length $f_T$ and the radius of curvature R of the concave mirror at the front surface 141-$i$ of a laser gain medium 143-$i$. For given values of $f_T'$, h, $n_1$ and $n_2$, the values of the lengths $d_1$, $d_2$ and R are determined for which the light beam minimum spot size s remains constant from one optical section to the next section, as in Eq. (1) above.

Figure 12:
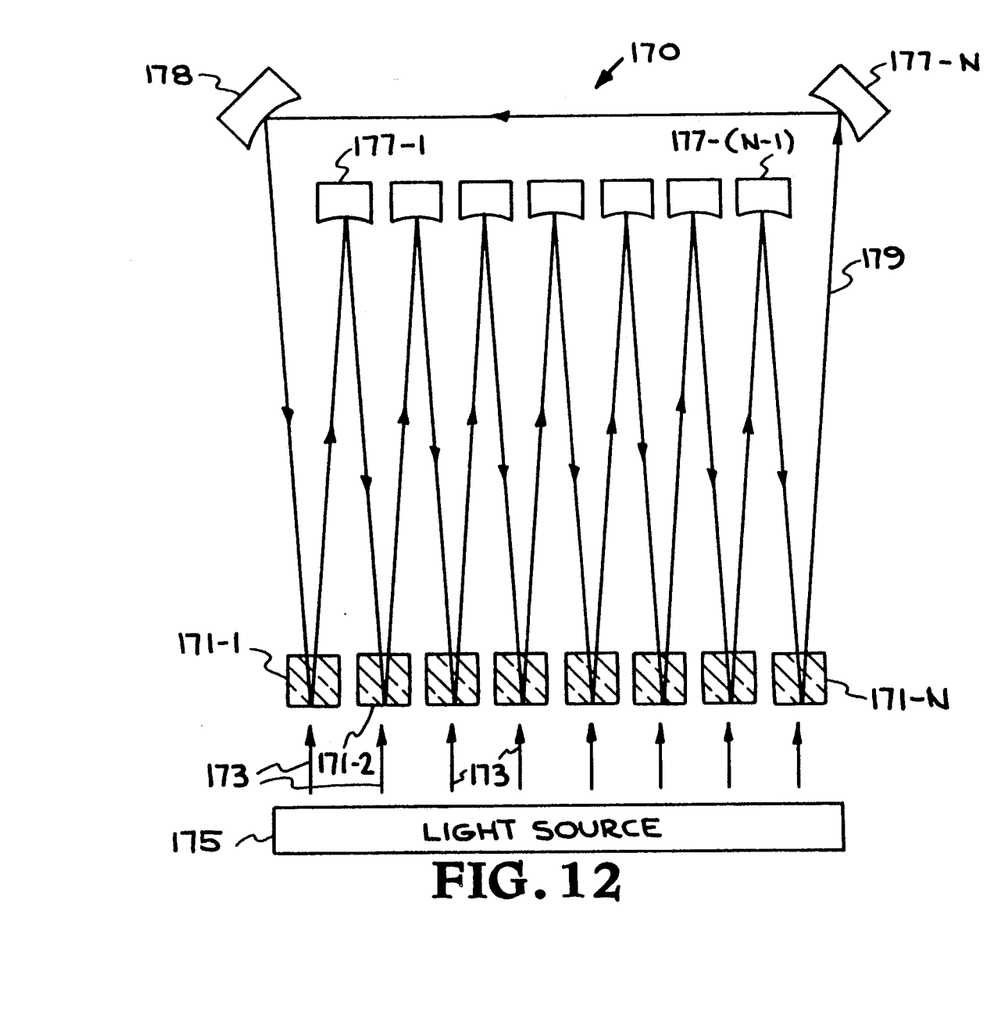
FIG. 12 is a schematic view of a ring laser constructed according to the invention.

In another embodiment 160, illustrated in FIG. 11, the front surfaces 161-$i$ (i=1, 2, ..., N) of N laser gain media 163-$i$ are provided with curvilinear reflecting surfaces with radii of curvature $R_1$ and are pumped by a pump light beam 165 produced by a pump light source 167. A plurality of spaced apart fold mirrors 169-$j$ (j=1, ..., N−1 or N) are also provided with curvilinear reflecting surfaces with radii of curvature $R_2$. The equivalent ray matrix M for the optical section illustrated in FIG. 12 becomes $$M = M_2(R_1)M_1(d_1,h;n_1,n_2)[M_2(R'(R_2,f_T))M_1(d_2,h;n_1,n_2)M_2(R_3)M_1(d_2,h;n_1,n_2)]^{N-1}M_2(R'(R_2,f_T))M_1(d_1,h;n_1,n_2)M_2(R_1), \quad (6)$$

and the criteria for determination of the lengths $d_1$ and $d_2$ and the radii of curvature $R_1$ and $R_2$ are qualitatively the same as for the equations (1) and (5). In FIG. 11, the back surfaces 162-1 and 162-2 of the laser gain media 163-1 and 163-2 may each also be given a finite radius of curvature $R=R_3$. More generally, the front surfaces of the laser gain media, the back surfaces of the laser gain media and the reflecting surfaces of the fold mirrors may be independently chosen to be planar or curvilinear, provided that at least one of these sets of surfaces is curvilinear. The radii of curvature $R_1$, $R_2$ and $R_3$ and the distances $d_1$ and $d_2$ in FIG. 11 are chosen to provide an optically stable cavity and to compensate for the thermal lens that develops within a laser gain medium when that medium is pumped by a pump light beam.

In another embodiment 170 of a laser optical cavity according to the invention, illustrated in FIG. 12, one or a plurality of N optical sections, each containing a laser gain medium 171-$i$ (i=1, 2, ..., N) and a spaced apart fold mirror 177-$i$, are concatenated, with the last fold mirror 177-N being tilted to direct the light beam 179 reflected therefrom to another fold mirror 181 that receives and reflects this light beam toward the first laser gain medium 171-1 in the sequence. The laser gain medium 171-$i$ pumped by a pump light beam 173 that is produced by a pump light light source 175. This configuration operates as a a ring laser. The output coupler may be any fold mirror 177-$i$ or the fold mirror 181.

Figure 13:
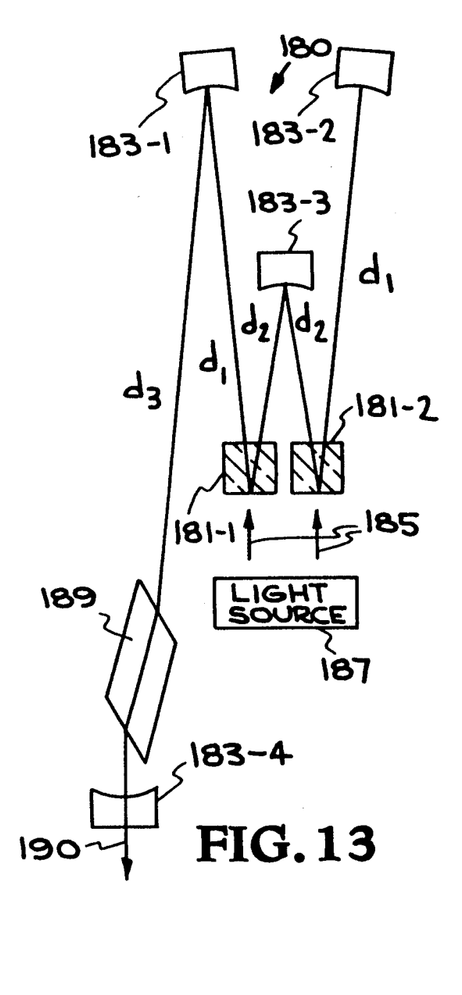
FIG. 13 is a schematic view of a Q-switched laser according to the invention.

FIG. 13 illustrates another embodiment 180, which is a Q-switched laser cavity including two or more laser gain media 181-1 and 181-2 and two fold mirrors 183-1 and 183-2, facing and spaced apart from the respective laser gain media 181-1 and 181-2 by a distance $d_1$. A third fold mirror 183-3 faces and is spaced apart from each of the two laser gain media 181-1 and 181-2 by a distance $d_2<d_1$. A fourth fold mirror 183-4 faces and is spaced apart from the first fold mirror 183-1 by a distance $d_3$, to reflect and return an incident light beam along its original optical path. The fold mirrors 181-2 and 183-4 serve as backreflectors. The fold mirrors 183-1, 183-2, 183-3 and 183-4 have radii of curvature $R_1$, $R_1$, $R_2$ and $R_3$, respectively. The laser gain media 181-1 and 181-2 are pumped by a pump light beam 185 produced by a pump light source 187. A Q-switch 189 is positioned in the portion of the optical path between the fold mirrors 183-1 and 183-4, spaced apart from the fold mirror 183-1 by a distance $d_4$. In one version of this embodiment, the radii of curvatures are chosen to be $R_1=30$ cm, $R_2=10$ cm and $R_3=50$ cm, and the separation distances are chosen to be $d_1=30$ cm, $d_2=4.2$ cm and $d_3=100$ cm.

Figure 14:
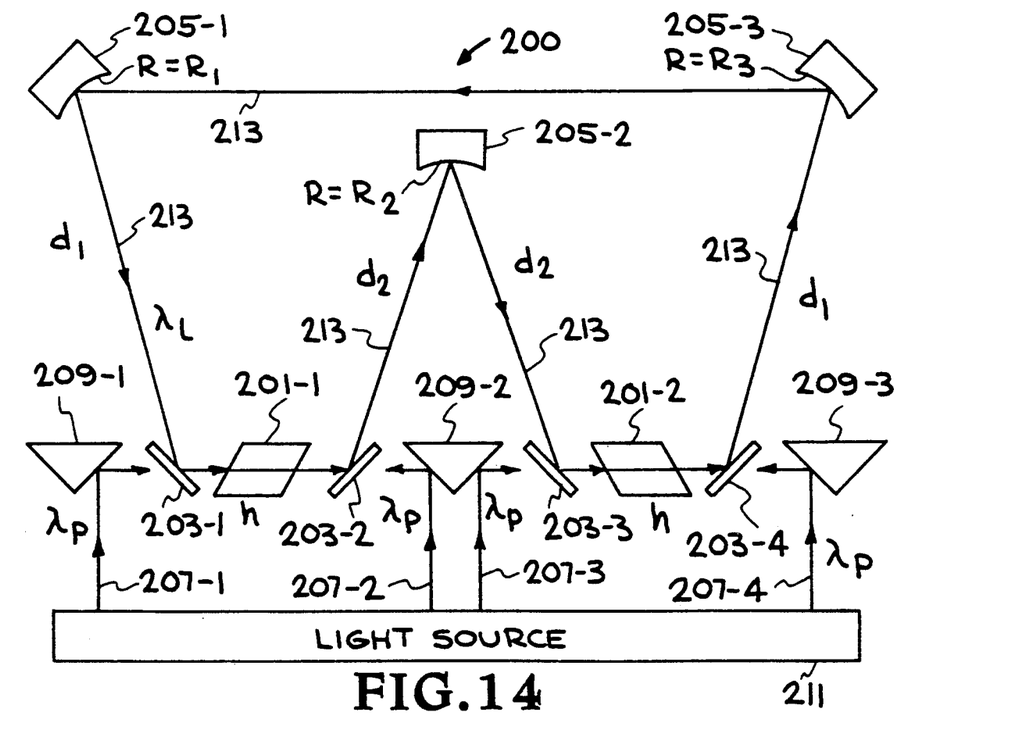
FIG. 14 is a schematic view of another embodiment of a ring laser according to the invention.

An additional problem that may be encountered with the high power light beams present in the laser gain media is hole burning, wherein a high power beam passing through a laser gain medium depletes most or all of the medium's stored energy along all or a portion of an optical path therein so that stimulated release of such stored energy occurs uncontrollably. FIG. 14 illustrates one embodiment 200 of the invention that suppresses the tendency of hole burning to occur. A plurality of $N \geq 2$ laser gain crystals 201-1 and 201-2 are spaced apart from one another as shown and are each flanked by two dichroic mirrors 203-$i$ ($i=1, 2, \ldots, 2N$), one on each side thereof. Each dichroic mirror 203-$i$ reflects a light beam of wavelength $\lambda = \lambda_L$ and transmits a pump light beam of wavelength $\lambda = \lambda_P$. Two such mirrors 203-1 and 203-2 flank the laser gain medium 202-2, and two such mirrors 203-3 and 203-4 flank the laser gain medium 201-2. Each such mirror is positioned and oriented to reflect an incident light beam 213 of wavelength $\lambda_L$ toward a fold mirror 205-$i$ ($i=1, 2, \ldots, N+1$) or toward one of the laser gain media 201-$i$, as indicated in FIG. 14. The laser gain media 201-$i$ are pumped by a plurality of pump light beams 207-$j$ ($j=1, 2, \ldots, 2N$) of wavelength $\lambda_P$, with each pump light beam 207-$j$ being reflected by a reflecting surface, such as a prism, 209-$k$ ($k=1, 2, \ldots, N+1$) through one of the dichroic mirrors 203-$i$ into a laser gain medium 201-$i$ to pump that medium. The pump light beams 207-$j$ are produced by a pump light source 211. The first and last fold mirrors 205-1 and 205-($N+1$) ($N=2$ here) are positioned and oriented so that the optical cavity illustrated in FIG. 14 operates as a ring laser. The laser light beam 213 passes from the fold mirror 205-1 to the dichroic mirror 203-1, is reflected and passes through the laser gain medium 201-1, is reflected by the dichroic mirror 203-2 and passes to the fold mirror 205-2, is reflected thereat and passes to the dichroic mirror 207-3, is reflected and passes through the laser gain medium 201-2, is reflected at the dichroic mirror 203-4 and passes to the fold mirror 205-3, and is reflected thereat and passes to the fold mirror 205-1 for reflection thereat and repetition of this process. The laser gain media 201-1 and 201-2 need not each be pumped by two pump light beams 207-1 and 207-2 (for 201-1) and 207-3 and 207-4 (for 201-2). One or both of the laser gain media 201-1 and 201-2 may be pumped by a single light beam each, for example by the pump light beams 207-1 and 207-3, respectively. In such instance, only the mirrors 203-$i$ through which the pump light beam passes need be dichroic. The embodiment of a ring laser illustrated in FIG. 14 suppresses, or perhaps eliminates, occurrence of hole burning in an optical cavity constructed according to the invention. The ray matrix analysis of the optical cavity shown in FIG. 14 focuses on the equivalent ray matrix $$M = M_1(d_1, h/2; n_1, n_2) M_2(f_T/2) M_1(d_2, h/2; n_1, n_2) M_2 \\ (R_2) M_1(d_2, h/2; n_1, n_2) M_2(f_T/2) M_1(d_1, h/2; n_1, n_2) M_2(R_3) \\ M_1(d_3, 0; n_1, n_2) M_2(R_1), \quad (7)$$

where a thermal lens of focal length $f_T$ is assumed to develop in the center of each of the laser gain media 201-1 and 201-2. For a fixed length h for each laser gain medium 201-1 and 201-2, the radii of curvature $R_1$, $R_2$ and $R_3$ for the respective fold mirrors 205-1, 205-2 and 205-3 and the optical path distances $d_1$, $d_2$ and $d_3$ shown in FIG. 14 are chosen to provide an optically stable cavity and to compensate for a thermal lens that develops when a laser gain medium is pumped by a pump light beam. The first and second surfaces of each of the laser gain media 201-$i$ may be given an anti-reflection coating to enhance transmission and suppress reflection at such surface. Alternatively, the first and second surfaces of each of the laser gain media 201-$i$ may be a Brewster angle window to promote transmission at such surface.

In any of the embodiments illustrated herein, the laser gain material is preferably chosen to be Nd:YAG or Nd:YLF, which emit on useful lines at $\lambda_L = 0.946$ μm, 1.064 μm and 1.319 μm for YAG and $\lambda_L = 1.047$ μm and 1.3 μm for YLF, or Tm:YAG, Tm:YLF, Tm/Ho:YAG and Tm/Ho:YLF, which emit on several useful lines in the range $\lambda_L = 2.0$–$2.1$ μm. The pump light beam may have a wavelength $\lambda_P = 0.81$ μm or $\lambda_P = 0.78$ μm for Nd-based laser gain action or for Tm-based and Tm/Ho-based laser gain action, respectively. Other rare earth dopants, such as Ce, Eu, Tb, Er and Yb, may also be used for the laser gain medium, with provision of an appropriate pump light beam wavelength $\lambda_P$.

The invention disclosed here provides an optical cavity for a laser or for a single-pass or multiple-pass amplifier that consists of one or a plurality of optical sections, with thermal lens effects within each laser gain medium being compensated for within that optical section. A plurality of these optical sections can then be concatenated to allow easy scale-up of light beam output power, limited only by the optical absorption and losses that occur at each optical component.

We claim:

1. Apparatus for producing a laser light beam of high output light beam power, the apparatus comprising:
   a pump light source to produce and issue a plurality of pump light beams that have a wavelength approximately equal to a predetermined wavelength $\lambda_P$;
   a solid state laser gain crystal having first and second opposed planar surfaces, spaced apart and approximately parallel to each other, the crystal being positioned to receive the plurality of pump light beams at the first surface and to allow the pump light beams to propagate therethrough from the first surface to the second surface to excite the crystal so that the crystal produces and issues a light beam, and receives an incident light beam and amplifies and issues an amplified light beam, having a wavelength approximately equal to a predetermined wavelength $\lambda_L$, where the first surface of the crystal is transmitting for an incident light beam of wavelength $\lambda_P$ and is highly reflective for an incident light beam of wavelength $\lambda_L$ and the second surface of the crystal is highly transmitting for an incident light beam of wavelength $\lambda_L$;
   a plurality of M reflecting surfaces numbered $m = 1, 2, \ldots, M$ ($M \geq 2$), where the reflecting surfaces are positioned adjacent to one another and spaced apart from and facing the second surface of the laser gain crystal by a predetermined distance d and each reflecting surface has an approximately identical radius of curvature R, where reflecting surface number m receives a light beam from the crystal and reflects the light beam back to the crystal and the crystal receives and reflects this reflected light beam toward reflector number $m+1$ ($m = 1, \ldots, M-1$), and where the radius of curvature R and the distance d are chosen to provide a stable optical system and to compensate for a thermal lens that develops in a crystal that receives an incident pump light beam.

2. Apparatus for producing a laser light beam of high output light beam power, the apparatus comprising:
   a pump light source to produce and issue a plurality of pump light beams that have a wavelength approximately equal to a predetermined wavelength $\lambda_P$;

a plurality of N solid state laser gain crystals numbered n=1,2, ..., N (N≧2), each crystal having first and second opposed planar surfaces that are spaced apart and approximately parallel to each other, each crystal being positioned to receive at least one of the pump light beams at its first surface and to allow the pump light beam to propagate therethrough from its first surface to its second surface to excite the crystal so that the crystal produces and issues a light beam, and receives an incident light beam and amplifies and issues an amplified light beam, having a wavelength approximately equal to a predetermined wavelength $\lambda_L$, where the first surface of each crystal is transmitting for an incident light beam of wavelength $\lambda_P$ and is highly reflecting for an incident light beam of wavelength $\lambda_L$ and the second surface of each crystal is highly transmitting for an incident light beam of wavelength $\lambda_L$;

a plurality of M reflecting surfaces numbered m=1, 2, ..., M (M=N−1 or N or N+1), where the reflecting surfaces are positioned adjacent to one another and facing the laser gain crystals and reflecting surface number m is spaced apart from the second surfaces of each of laser gain crystals number m and m+1 by a predetermined distance d (m=1, ..., N−1) and each reflecting surface has an approximately identical radius of curvature R, where reflecting surface number m receives a light beam from crystal number m and reflects the light beam back to crystal number m+1 and crystal number m+1 receives and reflects this reflected light beam toward reflecting surface number m+1 (m=1, ..., M−1), and where the radius of curvature R and the distance d are chosen to provide a stable optical system and to compensate for a thermal lens that develops in a crystal that receives an incident pump light beam.

3. The apparatus of claim 2, wherein said integer M=N−1, further comprising:
an Nth reflecting surface having a radius of curvature $R_1$, being positioned a distance $d_1$ from said laser gain crystal number N, and being positioned to receive a light beam reflected from said crystal number N and to reflect this light beam in a predetermined direction that avoids each of said N laser gain crystals and avoids each of said N−1 other reflecting surfaces; and
an (N+1)th reflecting surface having a radius of curvature $R_2$, being positioned a distance $d_2$ from said laser gain crystal number 1, and being positioned to receive the light beam reflected in the predetermined direction by the Nth reflecting surface and to reflect this light beam toward said laser gain crystal number 1, where the radii of curvature R, $R_1$ and $R_2$ and the distances d, $d_1$ and $d_2$ are chosen to provide a stable optical system and to compensate for said thermal lens that develops in each of said crystals for an incident pump light beam.

4. The apparatus of claim 2, wherein said integer M=N−1, further comprising light beam input means for producing an input light beam of wavelength approximately $\lambda_L$ and for directing this input light beam so that this input light beam is reflected from said second surface of said laser gain crystal number 1 and is reflected therefrom to said reflecting surface number 1, whereby the apparatus operates as a light beam amplifier.

5. The apparatus of claim 2, wherein said integer M=N−1, further comprising:
an Nth reflecting surface having a radius of curvature $R_1$, being positioned a distance $d_1$ from said laser gain crystal number N, and being positioned to receive a light beam reflected from said crystal number N and to reflect and return this light beam to said laser gain crystal number N and avoids each of said N−1 other reflecting surfaces; and
an (N+1)th reflecting surface having a radius of curvature $R_2$, being positioned a distance $d_2$ from said laser gain crystal number 1, and being positioned to receive the light beam reflected from said laser gain crystal number 1 and to reflect and return this light beam to said laser gain crystal number 1, where the radii of curvature R, $R_1$ and $R_2$ and the distances d, $d_1$ and $d_2$ are chosen to provide a stable optical system and to compensate for said thermal lens that develops in each of said crystals for an incident pump light beam.

6. The apparatus of claim 2, wherein said integer M=N+1, further comprising:
an (N+2)th reflecting surface having a radius of curvature $R_1$, being positioned a distance $d_1$ from said reflecting surface number 1, and being positioned to receive the light beam reflected from said reflecting surface number 1 and to reflect and return this light beam to said reflecting surface number 1, where the radii of curvature R and $R_1$ and the distances d and $d_1$ are chosen to provide a stable optical system and to compensate for said thermal lens that develops in each of said crystals for an incident pump light beam; and
Q-switch means, positioned between the reflecting surfaces number 1 and number N+2, to delay initiation of laser action within an optical cavity that includes these two reflecting surfaces until a selected time delay has occurred.

7. The apparatus of claim 2, wherein the material for said laser gain crystals is selected from the group consisting of Nd:YAG, Tm:YAG, Tm/Ho:YAG, Nd:YLF, Tm:YLF and Tm/Ho:YLF.

8. Apparatus for producing a laser light beam of high output light beam power, the apparatus comprising:
a pump light source to produce and issue a plurality of pump light beams having a wavelength approximately equal to a predetermined wavelength $\lambda_P$;
a plurality of N solid state laser gain crystals (N≧2), each crystal having first and second opposed surfaces that are spaced apart and facing each other, with the first surface having a radius of curvature R and the second surface being planar, each crystal being positioned to receive at least one pump light beam at its first surface and to allow the pump light beam to propagate therethrough from its first surface to its second surface to excite the crystal so that the crystal produces and issues a light beam, and receives an incident light beam and amplifies and issues an amplified light beam, having a wavelength approximately equal to a predetermined wavelength $\lambda_L$, where the first surface of each crystal is transmitting for an incident light beam of wavelength $\lambda_P$ and is highly reflecting for an incident light beam of wavelength $\lambda_L$ and the second surface of each crystal is highly transmitting for an incident light beam of wavelength $\lambda_L$;

a plurality of M planar, approximately parallel reflecting surfaces numbered $m=1,2,\ldots,M$ ($M=N-1$ or $N$ or $N+1$), where the reflecting surfaces are positioned adjacent to one another and reflecting surface number m is spaced apart from the second surface of each of laser gain crystals number m and $m+1$ by a predetermined distance d ($m=1,\ldots,N-1$), where reflecting surface number m receives a light beam from crystal number m and reflects the light beam back to crystal number $m+1$ and crystal number $m+1$ receives and reflects this reflected light beam toward reflecting surface number $m+1$, and where the radius of curvature R and the distance d are chosen to provide a stable optical system and to compensate for a thermal lens that develops in a crystal that receives an incident pump light beam.

9. The apparatus of claim 8, wherein said integer $M=N-1$, further comprising:

an Nth reflecting surface having a radius of curvature $R_1$, being positioned a distance $d_1$ from said laser gain crystal number N, and being positioned to receive a light beam reflected from said crystal number N and to reflect this light beam in a predetermined direction that avoids each of said N laser gain crystals and avoids each of said $N-1$ other reflecting surfaces; and an $(N+1)$th reflecting surface having a radius of curvature $R_2$, being positioned a distance $d_2$ from said laser gain crystal number 1, and being positioned to receive the light beam reflected in the predetermined direction by the Nth reflecting surface and to reflect this light beam toward said laser gain crystal number 1, where the radii of curvature R, $R_1$ and $R_2$ and the distances d, $d_1$ and $d_2$ are chosen to provide a stable optical system and to compensate for said thermal lens that develops in each of said crystals for an incident pump light beam.

10. The apparatus of claim 8, wherein said integer $M=N-1$, further comprising light beam input means for producing an input light beam of wavelength approximately $\lambda_L$ and for directing this input light beam so that this input light beam is reflected from said second surface of said laser gain crystal number 1 and is reflected therefrom to said reflecting surface number 1, whereby the apparatus operates as a light beam amplifier.

11. The apparatus of claim 8, wherein said integer $M=N-1$, further comprising:

an Nth reflecting surface having a radius of curvature $R_1$, being positioned a distance $d_1$ from said laser gain crystal number N, and being positioned to receive a light beam reflected from said crystal number N and to reflect and return this light beam to said laser gain crystal number N and avoids each of said $N-1$ other reflecting surfaces; and an $(N+1)$th reflecting surface having a radius of curvature $R_2$, being positioned a distance $d_2$ from said laser gain crystal number 1, and being positioned to receive the light beam reflected from said laser gain crystal number 1 and to reflect and return this light beam to said laser gain crystal number 1, where the radii of curvature R, $R_1$ and $R_2$ and the distances d, $d_1$ and $d_2$ are chosen to provide a stable optical system and to compensate for said thermal lens that develops in each of said crystals for an incident pump light beam.

12. The apparatus of claim 8, wherein said integer $M=N+1$, further comprising:

an $(N+2)$th reflecting surface having a radius of curvature $R_1$, being positioned a distance $d_1$ from said reflecting surface number 1, and being positioned to receive the light beam reflected from said reflecting surface number 1 and to reflect and return this light beam to said reflecting surface number 1, where the radii of curvature R and $R_1$ and the distances d and $d_1$ are chosen to provide a stable optical system and to compensate for said thermal lens that develops in each of said crystals for an incident pump light beam; and Q-switch means, positioned between the reflecting surfaces number 1 and number $N+2$, to delay initiation of laser action within an optical cavity that includes these two reflecting surfaces until a selected time delay has occurred.

13. The apparatus of claim 8, wherein the material for said laser gain crystals is selected from the group consisting of Nd:YAG, Tm:YAG, Tm/Ho:YAG, Nd:YLF, Tm:YLF and Tm/Ho:YLF.

14. Apparatus for producing a laser light beam of high output light beam power, the apparatus comprising:

a pump light source to produce and issue a plurality of pump light beams that have a wavelength approximately equal to a predetermined wavelength $\lambda_P$;

a plurality of N solid state laser gain crystals ($N \geq 2$), each having first and second opposed surfaces that are spaced apart and facing each other, the first surface having a radius of curvature $R_1$ and the second surface having a radius of curvature $R_2$, each crystal being positioned to receive the pump light beam at its first surface and to allow the pump light beam to propagate therethrough from its first surface to its second surface to excite the crystal so that the crystal produces and issues a light beam, and receives and amplifies an incident light beam, having a wavelength $\lambda$ approximately equal to a predetermined wavelength $\lambda_L$, where the first surface of each crystal is transmitting for an incident light beam of wavelength $\lambda_P$ and is highly reflecting for an incident light beam of wavelength $\lambda_L$ and the second surface of each crystal is highly transmitting for an incident light beam of wavelength $\lambda_L$;

a plurality of M reflecting surfaces numbered $m=1, 2,\ldots,M$ ($M=N$ or $N+1$), where the reflecting surfaces are positioned adjacent to one another and facing the second surfaces of the laser gain crystals and reflecting surface number m is spaced apart from the second surfaces of each of laser gain crystals number m and $m+1$ by a predetermined distance $d(m=1,\ldots,M-1)$ and each reflecting surface has an approximately identical radius of curvature $R_3$, where reflecting surface number n receives a light beam from crystal number m and reflects the light beam back to crystal number $m+1$ and crystal number $m+1$ receives and reflects this reflected light beam toward reflecting surface number $m+1$, and where the radii of curvature $R_1$ and $R_2$ and the distance d are chosen to provide a stable optical system and to compensate for a thermal lens that develops in a crystal that receives an incident pump light beam.

15. The apparatus of claim 14, wherein said integer $M=N-1$, further comprising:

an Nth reflecting surface having a radius of curvature $R_4$, being positioned a distance $d_1$ from said laser gain crystal number N, and being positioned to receive a light beam reflected from said crystal number N and to reflect this light beam in a predetermined direction that avoids each of said N laser gain crystals and avoids each of said $N-1$ other reflecting surfaces; and an $(N+1)$th reflecting surface having a radius of curvature $R_5$, being positioned a distance $d_2$ from said laser gain crystal number 1, and being positioned to receive the light beam reflected in the predetermined direction by the Nth reflecting surface and to reflect this light beam toward said laser gain crystal number 1, where the radii of curvature $R_1$, $R_2$, $R_3$, $R_4$ and $R_5$ and the distances d, $d_1$ and $d_2$ are chosen to provide a stable optical system and to compensate for said thermal lens that develops in each of said crystals for an incident pump light beam.

16. The apparatus of claim 14, wherein said integer $M=N-1$, further comprising light beam input means for producing an input light beam of wavelength approximately $\lambda_L$ and for directing this input light beam so that this input light beam is reflected from said second surface of said laser gain crystal number 1 and is reflected therefrom to said reflecting surface number 1, whereby the apparatus operates as a light beam amplifier.

17. The apparatus of claim 14, wherein said integer $M=N-1$, further comprising:

an Nth reflecting surface having a radius of curvature $R_3$, being positioned a distance $d_3$ from said laser gain crystal number N, and being positioned to receive a light beam reflected from said crystal number N and to reflect and return this light beam to said laser gain crystal number N and avoids each of said $N-1$ other reflecting surfaces; and an $(N+1)$th reflecting surface having a radius of curvature $R_4$, being positioned a distance $d_4$ from said laser gain crystal number 1, and being positioned to receive the light beam reflected from said laser gain crystal number 1 and to reflect and return this light beam to said laser gain crystal number 1, where the radii of curvature $R_1$, $R_2$, $R_3$ and $R_4$ and the distances d, $d_3$ and $d_4$ are chosen to provide a stable optical system and to compensate for said thermal lens that develops in each of said crystals for an incident pump light beam.

18. The apparatus of claim 14, wherein said integer $M=N+1$, further comprising:

an $(N+2)$th reflecting surface having a radius of curvature $R_3$, being positioned a distance $d_3$ from said reflecting surface number 1, and being positioned to receive the light beam reflected from said reflecting surface number 1 and to reflect and return this light beam to said reflecting surface number 1, where the radii of curvature $R_1$, $R_2$ and $R_3$ and the distances d and $d_3$ are chosen to provide a stable optical system and to compensate for said thermal lens that develops in each of said crystals for an incident pump light beam; and Q-switch means, positioned between the reflecting surfaces number 1 and number $N+2$, to delay initiation of laser action within an optical cavity that includes these two reflecting surfaces until a selected time delay has occurred.

19. The apparatus of claim 14, wherein the material for said laser gain crystal is selected from the group consisting of Nd:YAG, Tm:YAG, Tm/Ho:YAG, Nd:YLF, Tm:YLF and Tm/Ho:YLF.

20. The apparatus of claim 14, wherein said radius of curvature $R_1$ is chosen to be infinite.

21. The apparatus of claim 14, wherein said radius of curvature $R_2$ is chosen to be infinite.

22. The apparatus of claim 14, wherein said radius of curvature $R_3$ is chosen to be infinite.

23. Apparatus for producing a laser light beam of high output light beam power, the apparatus comprising:

a pump light source to produce and issue a plurality of pump light beams that have a wavelength approximately equal to a predetermined wavelength $\lambda_P$;

two solid state laser gain crystals numbered $n=1, 2$, each crystal having first and second opposed planar surfaces that are spaced apart and approximately parallel to each other, each crystal being positioned to receive at least one of the pump light beams at its first surface and to allow the pump light beam to propagate therethrough from its first surface to its second surface to excite the crystal so that the crystal produces and issues a light beam, and receives an incident light beam and amplifies and issues an amplified light beam, having a wavelength approximately equal to a predetermined wavelength $\lambda_L$, where the first surface of each crystal is transmitting for an incident light beam of wavelength $\lambda_P$ and is highly reflecting for an incident light beam of wavelength $\lambda_L$ and the second surface of each crystal is highly transmitting for an incident light beam of wavelength $\lambda_L$;

each laser gain crystal having at least one pump light beam reflecting surface spaced apart from that crystal and positioned to receive a pump light beam and to reflect this pump light beam so that the reflected pump light beam passes through the first surface of the crystal and into the crystal to propagate therethrough;

each laser gain crystal having first and second mirrors associated therewith, with the first mirror being positioned adjacent to and spaced apart from the first surface of the laser gain crystal, with the second mirror being positioned adjacent to and spaced apart from the second surface of the laser gain crystal so that the crystal lies between the first and second mirrors, and with each mirror being highly reflecting for incident light having a wavelength $\lambda_L$, where one of the first and second mirrors is positioned to receive and reflect an incident light beam so that this reflected light beam passes through the first or second surface of the adjacent laser gain crystal, into and through the crystal and issues from the crystal at the other of the first and second surfaces, where the other of the first and second mirrors is positioned to receive this reflected light beam from the crystal and to relect this reflected light beam in another direction, and where at least one of the first and second mirrors is dichroic and is transmitting for an incident light beam having a wavelength $\lambda_P$ and this mirror is positioned between a pump light beam reflecting surface and the laser gain crystal to receive and transmit to the laser gain crystal a pump light beam that is reflected from the pump light beam reflecting surface;

a first reflecting surface positioned adjacent to and facing the two laser gain crystals and being spaced apart from the second surface of the first laser gain crystal and spaced apart from the first surface of the second laser gain crystal by a distance $d_1$ and having a radius of curvature $R_1$, where this reflecting surface receives a light beam from a mirror associated with crystal number 1 and reflects the light beam back to a mirror associated with crystal number 2;

a second reflecting surface positioned adjacent to and facing the second laser gain crystal and spaced apart from one of the first and second surfaces of the second laser gain crystal by an optical path distance $d_2$ and having a radius of curvature $R_2$, where this reflecting surface receives an incident light beam from one of the mirrors associated with the second laser gain crystal and reflects this incident light beam in a different direction; and a third reflecting surface positioned adjacent to and facing the first laser gain crystal and spaced apart from one of the first and second surfaces of the first laser gain crystal by an optical path distance $d_3$ and having a radius of curvature $R_3$, where this reflecting surface receives an incident light beam from the second reflecting surface and reflects this incident light beam toward one of the mirrors associated with the first laser gain crystal, where the radii of curvature $R_1$, $R_2$ and $R_3$ and the distances $d_1$, $d_2$ and $d_3$ are chosen to provide a stable optical system and to compensate for a thermal lens that develops in a crystal that receives an incident pump light beam.

24. The apparatus of claim 23, wherein the material for said laser gain crystals is selected from the group consisting of Nd:YAG, Tm:YAG, Tm/Ho:YAG, Nd:YLF, Tm:YLF and Tm/Ho:YLF.

* * * * *